United States Patent [19]

Muhle et al.

[11] Patent Number: 5,672,666
[45] Date of Patent: Sep. 30, 1997

[54] PROCESS FOR TRANSITIONING BETWEEN INCOMPATIBLE POLYMERIZATION CATALYSTS

[75] Inventors: Michael Elroy Muhle, Kingwood; Agapios Kyriacos Agapiou, Humble; Gary Thomas Renola, Seabrook, all of Tex.

[73] Assignee: Exxon Chemical Patents Inc., Houston, Tex.

[21] Appl. No.: 461,799

[22] Filed: Jun. 5, 1995

[51] Int. Cl.⁶ ........................................................ C08F 2/34
[52] U.S. Cl. ........................ 526/82; 526/84; 526/901
[58] Field of Search ............................ 526/82, 84, 901

[56] References Cited

U.S. PATENT DOCUMENTS

| 4,433,122 | 2/1984 | Knorr et al. | 526/83 |
| 4,460,755 | 7/1984 | Williams et al. | 526/84 |
| 5,442,019 | 8/1995 | Agapiou et al. | 526/82 |

FOREIGN PATENT DOCUMENTS

| 0 107 105 | 5/1984 | European Pat. Off. . |
| 42 41 530 | 6/1984 | Germany . |

Primary Examiner—Thomas R. Weber
Attorney, Agent, or Firm—Jaimes Sher; Denise Y. Wolfs

[57] ABSTRACT

This invention relates to a process for transitioning between polymerization catalyst systems which are incompatible with each other. Particularly, the invention relates to a process for transitioning from an olefin polymerization reaction utilizing a traditional Ziegler-Natta catalyst system to a metallocene-olefin polymerization reaction.

27 Claims, No Drawings

PROCESS FOR TRANSITIONING BETWEEN INCOMPATIBLE POLYMERIZATION CATALYSTS

FIELD OF THE INVENTION

This invention relates to a process for transitioning between polymerization catalyst systems which are incompatible with each other. Particularly, the invention relates to a process for transitioning between an olefin polymerization reaction utilizing a traditional Ziegler-Natta catalyst system to an olefin polymerization reaction utilizing a metallocene catalyst system and vice-versa.

BACKGROUND OF THE INVENTION

During the production of olefin polymers in a commercial reactor it is often necessary to transition from one type of catalyst system producing polymers having certain properties and characteristics to another catalyst system capable of producing polymers of different chemical and/or physical attributes. Transitioning between similar traditional Ziegler-Natta type catalysts, or compatible catalysts, generally takes place easily. However, where the catalysts are incompatible or of different types the process is typically complicated. For example, transitioning between a traditional Ziegler-Natta type catalyst and chromium based catalyst, two incompatible catalysts, it has been found that some of the components of the traditional Ziegler catalyst or the cocatalyst/activator act as poisons to the chromium based catalyst. Consequently, these poisons prevent the chromium catalyst from promoting polymerization.

In the past, to accomplish an effective transition between incompatible catalysts, the first catalyzed olefin polymerization process is stopped by various techniques known in the art. The reactor is then emptied, recharged and a second catalyst is introduced into a reactor. Such catalyst conversions are time consuming and costly because of the need for a reactor shut-down for an extended period of time during transition.

The term "catalyst killers" or "deactivating agents" refers to the deactivation of the catalyst, which may be a partial or a complete suppression of a polymerization reaction. It is known to use low molecular weight polar gases or polar liquids in order to "kill" traditional Ziegler-Natta catalysts systems. For example, EP-A-116,917 describes using carbon dioxide and alcohol as Ziegler-Natta catalyst killers. U.S. Pat. No. 4,701,489 discloses the use of water to suppress a traditional Ziegler-Natta catalyst polymerization process. It is also known to use high molecular weight products such as polyglycols, epoxides, ethylene copolymers, organic titanium compounds, alkoxysilanes, peroxides, zeolites as a water carrier, or surface active agents to kill traditional Ziegler-Natta catalysts. U.S. Pat. No. 4,460,755 describes a process for converting a polymerization reaction catalyzed by a Ziegler-type catalyst into one catalyzed by a chromium-based catalyst. This particular transition process utilizes a hydroxyl-containing compound which interacts with the Ziegler-type catalyst by a physical or chemical means.

Recently, metallocene type catalyst systems are being employed in polymerization processes to produce polyolefins generally having superior physical and chemical attributes to those products of traditional Ziegler-Natta catalyzed processes.

There are a variety of known metallocene catalyst killers. For example, catalyst killers for metallocene/alumoxane based catalyst systems include methanol and n-butanol. PCT International Publication No. WO 92/14766, published Sep. 3, 1992 describes the use of a volatile and/or non-volatile killers of metallocene based catalysts in a high pressure polymerization process.

It would be highly advantageous to have a process for transitioning between incompatible catalysts, without the need for halting the polymerization reaction, emptying the reactor to rid it of the original catalyst system and restarting the polymerization reaction with another catalyst system. In addition, this process for transitioning should not detrimentally effect the polymer product.

SUMMARY OF THE INVENTION

The invention is drawn to a process for transitioning between at least two incompatible catalysts and/or catalyst systems in a polymerization process. In one embodiment, the process of the invention comprises the steps of: a) discontinuing the introduction of one of the incompatible catalysts or catalyst systems into a reactor; b) introducing and dispersing throughout the reactor a deactivating agent; c) purging the reactor of any remaining deactivating agent; and d) introducing into the reactor, in the absence of any scavenger material, a second catalyst or catalyst system incompatible with the first catalyst system. As utilized herein, the phrase "in the absence of any scavenger material" means that the reactor is kept essentially free of any scavenger material. The time period that this occurs is equivalent to the time for essentially one "turn-over" of the second catalyst system. After the completion of one "turn-over", scavenging materials, if desired, can be utilized. Optionally, the deactivating agent can be introduced and dispersed into an active polymerization zone of the reactor. The phrase "active polymerization zone" as utilized herein means that polymerization conditions are maintained throughout the transition.

In one embodiment of the invention a process for transitioning between a polymerization reaction catalyzed by a traditional Ziegler-Natta type catalyst system to a polymerization reaction catalyzed by a metallocene-type catalyst system is provided and vice-versa. In a preferred embodiment the transitioning process of the invention is continuous.

DETAILED DESCRIPTION OF THE INVENTION

Introduction

The invention relates to a process for transitioning between incompatible catalysts and/or catalyst systems to convert a reactor from producing polymer with one type of system to another with minimal reactor down-time.

In particular, the process is drawn to in a preferred embodiment transitioning between traditional Ziegler-Natta catalyst/catalyst system and a metallocene catalyst/catalyst system. For the purposes of this patent specification and appended claims the terms "catalysts" and "catalyst systems" are used interchangeably.

The process of this invention can be used in a gas phase, solution phase, slurry or bulk phase polymerization process. A gas phase polymerization process in a fluidized bed reactor is preferred.

In a typical continuous gas fluidized bed polymerization process for the production of polymer from monomer, a gaseous stream comprising monomer is passed through a fluidized bed reactor in the presence of a catalyst under reactive conditions. A polymer product is withdrawn. Also withdrawn is a cycle gas stream, which is continuously circulated and usually cooled, and together with additional monomer sufficient to replace the monomer polymerized is returned to the reactor. In one embodiment the cycle gas stream is cooled to form a gas and a liquid phase mixture that is then introduced into the reactor. For a detailed description of a gas phase processes see U.S. Pat. Nos. 4,543,399, 4,588,790, 5,028,670, 5,352,769 and 5,405,922, all of which are herein fully incorporated by reference.

When transitioning between compatible catalysts there are typically only slight differences in their performance towards hydrogen and comonomer, however, when transitioning to an incompatible catalyst it is not as straightforward. For example, the extreme differences in response to molecular weight regulators, such as hydrogen and comonomer, of traditional Ziegler-Natta catalysts and metallocene catalysts make these catalysts incompatible. Any traces of active Ziegler-Natta catalyst will produce very high molecular weight product under metallocene catalyst reactor conditions. Furthermore, particularly in a continuous transitioning process, the interaction between the two incompatible catalysts may lead to production of high levels of small particles less than about 125 microns, termed fines. These fines can induce operability problems in the reactor such as fouling and sheeting. In addition, these operability problems often result in an inferior polymer product, in that for example, a film made from this product often will have a significant amount of gels. Applicants have discovered a process for transitioning between two or more incompatible catalysts, particularly useful in a continuous gas phase polymerization process, thus, mitigating or eliminating the problems mentioned above.

During the transition of a first catalyst to a second catalyst, particularly in a continuous process, it is reasonable to expect that interaction or contact of the two catalysts will occur. For compatible catalysts, the transition normally occurs by interrupting the feed of the first catalyst while introducing the feed of the second. Typically it takes many hours, such as up to about 72 hours, until the first catalyst is entirely consumed. So, for a long period of time the resin produced is a mixture from both the first and the second catalyst.

Catalyst Compatibility

As previously discussed, compatible catalysts are those catalysts having similar kinetics of termination and insertion of monomer and comonomer(s) and/or do not detrimentally interact with each other.

For the purposes of this patent specification and appended claims "incompatible catalysts" are those that satisfy one or more of the following: 1) those catalysts that in each others presence reduce the activity of at least one of the catalysts by greater than 50%; 2) those catalysts such that under the same reactive conditions one of the catalysts produces polymers having a molecular weight greater than two times higher than any other catalyst in the system; and 3) those catalysts that differ in comonomer incorporation or reactivity ratio under the same conditions by more than about 30%.

While in the preferred embodiment the process of the invention specifically addresses transitioning between a traditional Ziegler-Natta catalyst and a metallocene catalyst, it is within the scope of this invention that the process of the invention would apply to any transition between incompatible catalysts. For example, transitioning between a traditional Ziegler-Natta catalyst and a chromium catalyst or transitioning between a chromium catalyst and a metallocene catalyst or even transitioning between a traditional Ziegler-Natta titanium catalyst to a Ziegler-Natta vanadium catalyst. This invention contemplates that the direction of transitioning between incompatible catalysts is not limiting, however, it is preferred that the process of the invention transition from any other catalyst incompatible with a metallocene catalyst.

Traditional Ziegler-Natta catalysts typically in the art comprise a transition metal halide, such as titanium or vanadium halide, and an organometallic compound of a metal of Group 1, 2 or 3, typically trialkylaluminum compounds, which serve as an activator for the transition metal halide. Some Ziegler-Natta catalyst systems incorporate an internal electron donor which is complexed to the alkyl aluminum or the transition metal. The transition metal halide may be supported on a magnesium compounds or complexed thereto. This active Ziegler-Natta catalyst may also be impregnated onto an inorganic support such as silica or alumina. For the purposes of this patent specification chromium catalysts, for example, described in U.S. Pat. No. 4,460,755, which is incorporated herein by reference, are also considered to be traditional Ziegler-Natta catalysts. For more details on traditional Ziegler-Natta catalysts, see for example, U.S. Pat. Nos. 3,687,920, 4,086,408, 4,376,191, 5,019,633, 4,482,687, 4,101,445, 4,560,671, 4,719,193, 4,755,495, and 5,070,055 all of which are herein incorporated by reference.

Metallocene catalysts, for example, are typically those bulky ligand transition metal complexes derivable from the formula:

$$\{[(LP)_m M(A^q)_n]^{+k}\}_h [B'^{-j}]_i$$

where L is a bulky ligand bonded to M, p is the anionic charge of L and m is the number of L ligands and m is 1, 2 or 3; A is a ligand bonded to M and capable of inserting an olefin between the M-A bond, q is the anionic charge of A and n is the number of A ligands and n is 1, 2, 3 or 4, M is a metal, preferably a transition metal, and (p×m)+(q×n)+k corresponds to the formal oxidation state of the metal center; where k is the charge on the cation and k is 1, 2, 3 or 4, and B' is a chemically stable, non-nucleophillic anionic complex, preferably having a molecular diameter of 4 Å or greater and j is the anionic charge on B', h is the number of cations of charge k, and i the number of anions of charge j such that h×k=j×i.

Any two L and/or A ligands may be bridged to each other. The catalyst compound may be full-sandwich compounds having two or more ligands L, which may be cyclopentadienyl ligands or substituted cyclopentadienyl ligands, or half-sandwich compounds having one ligand L, which is a cyclopentadienyl ligand or heteroatom substituted cyclopentadienyl ligand or hydrocarbyl substituted cyclopentadienyl ligand such as an indenyl ligand, a benzindenyl ligand or a fluorenyl ligand and the like or any other ligand capable of $\eta^5$ bonding to a transition metal atom (M). One or more of these bulky ligands is π-bonded to the transition metal atom. Each L can be substituted with a combination of substituents, which can be the same or different including hydrogen or a linear, branched or cyclic alkyl, alkenyl or aryl radicals for example. The metal atom (M) may be a Group 4, 5 or 6 transition metal or a metal from the lanthanide and actinide series, preferably the transition metal is of Group 4 particularly, titanium, zirconium and hafnium in any formal oxidation state, preferably, +4. Other ligands may be bonded to the transition metal, such as a leaving group, such as but not limited to weak bases such as amines, phosphines, ether and the like. In addition to the transition metal, these ligands may be optionally bonded to A or L.

In one embodiment, the metallocene catalyst system utilized in this invention is formed from a catalyst compound represented by the general formula:

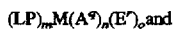

an aluminum alkyl, alumoxane, modified alumoxane or any other oxy-containing organometallic compound or non-coordinating ionic activators, or a combination thereof. Where L, M, A, and p, m, q and n are as defined above and E is an anionic leaving group such as but not limited to hydrocarbyl, hydrogen, halide or any other anionic ligand; r is the anionic charge of E and o is the number of E ligands and o is 1, 2, 3 or 4 such that $(p \times m)+(q \times n)+(r \times o)$ is equal to the formal oxidation state of the metal center. Non-limiting examples of metallocene catalyst components and metallocene catalyst systems are discussed in for example, U.S. Pat. Nos. 4,530,914, 4,805,561, 4,937,299, 5,124,418, 5,017,714, 5,057,475, 5,064,802, 5,278,264, 5,278,119, 5,304,614, 5,324,800, 5,347,025, 5,350,723, 5,391,790 and 5,391,789 all of which are herein fully incorporated by reference. Also, the disclosures of EP-A-0 591 756, EP-A-0 520 732, EP-A-0 578,838, EP-A-0 638,595, EP-A-0 420 436, WO 91/04257, WO 92/00333, WO 93/08221, WO 93/08199, WO 94/01471, WO 94/07928, WO 94/03506 and WO 95/07140, all of which are herein fully incorporated by reference.

In one preferred embodiment the metallocene catalyst utilized in this invention is deposited on support materials known in the art, for example, any porous support material such as inorganic chlorides and inorganic oxides, such as silica, alumina, magnesia, magnesium chloride or any polymeric material, such as polyethylene and polystyrene divinyl benzene. In another embodiment the metallocene catalyst utilized in this invention is unsupported as is described in U.S. Pat. No. 5,317,036, incorporated herein by reference.

Polymerization and Catalyst Inhibitors

In order to inhibit polymerization of a first incompatible catalyst, it is necessary to interrupt catalyst injection into the reactor. Stopping the first catalyst feed into the reactor does not immediately stop polymerization reactions occurring within the reactor because the fluidized bed contains catalyst particles which can still polymerize for an extended period of time. Even if one were to allow the polymerization reactions within the reactor to continue for a period of time, the catalyst within the reactor would not be completely deactivated for a considerable time period.

Thus, to substantially terminate these polymerization reactions within the reactor, "deactivating agents" are employed. For the purposes of this patent specification, the deactivating agents do not include that minor portion of material which functions as a catalyst killer and which may be contained in the monomer or comonomer feed streams during normal polymerization conditions (for example, internal olefins).

The deactivating agents used in this invention are those killers or inhibitors that inactivate a catalyst's ability to polymerize olefins. Deactivating agents of the invention include but are not limited to, for example, carbon dioxide, sulfur dioxides, sulfur trioxides, glycols, phenols, ethers, carbonyl compounds such as ketones, aldehydes, carboxylic acids, esters, fatty acids, alkynes such as acetylene, amines, nitriles, nitrous compounds, pyridine, pyroles, carbonylsulfide, organic halides such as carbon tetrachloride and mercaptans. It is also important that the deactivating agent not include oxygen, alcohol or free water. It has been found that use of these compounds, such as alcohols, results in the adherence of polymer fines to the walls of the reactor and subsequent reactor sheeting as shown in the following examples.

In an embodiment, the deactivating agent is a porous material, inorganic or organic, such as silica, for example, containing water that is either absorbed or adsorbed. Preferably the porous material containing water has a loss-on-ignition of greater than 3 weight percent. Loss-on-ignition is measured by determining the weight loss of the porous material held at a temperature of about 1000° C. for 16 hours. In another embodiment, the porous material is silica that is dehydrated at a temperature less than 200° C.

It is within the scope of this invention that these deactivating agents can be used in any combination, however, one of ordinary skill in the art will recognize that some of these killers could react with each other and are thus better introduced separately.

In the preferred embodiment in the process of the invention, once the first incompatible catalyst feed has been interrupted, a deactivating agent is introduced into the reactor for a period of time sufficient to substantially deactivate the catalyst in the reactor and thus, substantially prevent further polymerization from occurring. The use of the deactivating agent decreases the likelihood of sheeting and/or fouling occurring in the reactor where the process of the invention takes place within the reactor in which polymerization was occurring with the first catalyst. The preferred deactivating agent is carbon dioxide. The amount of deactivating agent used depends on the size of the reactor and the quantity and type of catalysts and cocatalysts in the reactor.

The minimum amount of deactivating agent used is important. It is necessary before introducing a second incompatible catalyst that the first catalyst is substantially deactivated and cannot reactivate itself.

Preferably, the deactivating agent of the invention in one embodiment is used in an amount based on the total gram atoms of the catalyst transition metal components in the reactor. However, where any activator or cocatalyst is used with the first catalyst, and such activator or cocatalyst is capable of reacting with the second catalyst, the deactivating agent is used in an amount based on the total gram atoms of the first catalyst transition metal components and any activator. In one embodiment the deactivating agent is used in an amount greater than 1 molar equivalent, preferably greater than 2 molar equivalents based on the total gram atoms transition metal of the first catalyst in the reactor.

Thus, in another embodiment the amount of deactivating agent introduced into the reactor is in the range of 1 to 10000 molar ratio of deactivating agent to the total metal of the first catalyst and any activator in the reactor, preferably 1 to 1000, more preferably about 1 to about 100. Often when using a Ziegler-Natta catalyst a scavenging component is used. In some circumstances the activator or cocatalyst functions as a scavenger as well. Thus, the deactivating agent should be used under these circumstances in an amount such that the molar ratio of the deactivating agent to the total metal of the catalyst and activator and/or scavenger exceeds about 1, preferably greater than about 1.5.

In another embodiment, the deactivating agent is used in an amount in the range of 100% to 125% of that necessary to fully inactivate all of the active first catalyst.

In yet another embodiment once the deactivating agent has been introduced into the reactor a period of time of from about 5 minutes to about 24 hours, preferably from about 1 hour to about 12 hours, more preferably from about 1 hour to 6 hours and most preferably from about 1 hour to 2 hours, passes before continuing the transitioning process. The duration depends on the nature and amount of catalyst and volume of the reactor, and reactivity of the deactivating agent. In a gas phase reactor there is a bed that is typically very large in size and quantity of polymer. Thus, a sufficient period of time is needed to allow the deactivating agent to disperse throughout the reactor, particularly throughout any polymer product within the reactor. For this and other reasons it is a preferred embodiment that the deactivating agent is a gas.

Typically, in the process of the invention it is important to substantially free the reactor of impurities, particularly the deactivating agent, which can render the second catalyst inactive upon its introduction into a reactor. Thus, in the preferred embodiment of the invention, pressure purging or flow purging procedures known in the art are used to remove the deactivating agent and any other impurities or byproducts.

In a typical process the first incompatible catalyst is a traditional Ziegler-Natta catalyst and an organometallic compound is introduced into the reactor acting as either an activator or a scavenger or both. These organometallic compounds can include for example, $BX_3$ where X is a halogen, $R_1R_2Mg$, ethyl magnesium, $R_4CORMg$, RCNR, $ZnR_2$, $CdR_2$, LiR, $SnR_4$ where each of the groups R is a hydrocarbon group that could be the same or different.

Other organometallic compounds typically used are those compounds of Group 1, 2, 3 and 4 organometallic alkyls, alkoxides, and halides. The preferred organometallic compounds used are lithium allcyls, magnesium or zinc alkyls, magnesium alkyl halides, aluminum alkyls, silicon alkyl, silicon alkoxides and silicon alkyl halides, the more preferred organometallic compounds being aluminum alkyls and magnesium alkyls. In an embodiment these organometallic compounds are a hydrocarbyl aluminum of the formula $AlR_{(3-a)}X_a$ where R is alkyl, cycloalkyl, aryl or a hydride radical. Each alkyl radical can be straight or branched chain having from 1 to 20 carbon atoms, preferably 1 to 10 carbon atoms. X is a halogen for example chlorine, bromine or iodine, chlorine is preferred; a is 0, 1 or 2. The most preferred organometallic compounds used are aluminum alkyls, for example, triethylaluminum (TEAL), trimethylaluminum (TMAL), tri-isobutylaluminum (TIBAL) and tri-n-hexylaluminum (TNHAL) and the like, the most widely used aluminum alkyl that is used as a scavenger or an activator or both is TEAL.

In the preferred embodiment of transitioning from a traditional Ziegler-Natta catalyst to a metallocene catalyst it is preferred that substantially all of the activating and/or scavenging compounds, for example TEAL, are removed from the process of the invention prior to the introduction of the metallocene catalyst. In one embodiment of the process when transitioning to a metallocene-type catalyst the process is operated essentially free of a scavenger prior to the introduction of the metallocene-type catalyst. For the purposes of this patent specification and appended claims the term "essentially free" means that during the process of the invention no more than 10 ppm of a scavenger based on the total weight of the recycle stream is present just prior to the introduction of the metallocene catalyst. Also it is important that if a common catalyst feeder system is used that it too be substantially free of any residual first incompatible catalyst.

In another embodiment the deactivating agent is any component capable of reacting with any of the organometallic compounds above to produce at least one compound having a carboxylic acid functionality. Non-limiting examples of carboxylic acid compounds include acetic acid, propionic acid, isopentanoic acid, and heptanoic acid.

Start-up Procedures

During the polymerization with the first incompatible catalyst, gases accumulate within the reactor, which originate from the electron donor when the first catalyst is especially a Ziegler-Natta catalyst. These gases are typically poisonous to the first catalyst, and particularly to the second incompatible catalyst. These gases for a traditional Ziegler-Natta catalyst include, for example, tetrahydrofuran (THF), ethanol, ethyl benzoate and the like. Also, the introduction of the deactivating agent produces by-products that can be detrimental to any polymerization process.

Thus, as previously mentioned, before introducing the second incompatible catalyst the reactor contents are subjected to what is known in the art as pressure purging. Typically the procedure is used in handling any air/moisture sensitive materials to remove, purge, or reduce in the process of the invention, for example, the catalyst killers and by-products thereof and reactants to a lower level.

Once this procedure is complete, the gas composition in the reactor system as a direct consequence of the first catalyst is adjusted for the second catalyst. For a given catalyst to produce a given product of a certain density and melt index, which generally depends on how well a catalyst incorporates comonomer, a certain gas composition must be present in the reactor.

Generally the gas composition contains one or more of the monomer(s) including ethylene alone or in combination with one or more linear or branched monomer(s) having from 3 to 20 carbon atoms, preferably 3 to 12 carbon atoms. The process is particularly well suited to gas compositions of ethylene in combination with one or more of the monomers, for example alpha-olefin monomers of propylene, butene-1, pentene-1, 4-methylpentene-1, hexene-1, octene-1, decene-1, styrene and cyclic and polycyclic olefins such as cyclopentene, norbornene and cyclohexene or a combination thereof. Other monomers for use with ethylene can include polar vinyl monomers, diolefins such as 1,4-pentadiene, 1,4-hexadiene, 1,5-hexadiene, norbornene, norbornadiene, and other unsaturated monomers including acetylene, 1-alkynes and aldehyde monomers. Higher alpha-olefins and polyenes or macromers can be used also. Preferably the comonomer is an alpha-olefin having from 3 to 15 carbon atoms, preferably 4 to 12 carbon atoms and most preferably 4 to 10 carbon atoms.

In another embodiment the gas composition contains ethylene with at least two different comonomers to form a terpolymer and the like, the preferred comonomers are a combination of alpha-olefin monomers having 3 to 10 carbon atoms, more preferably 3 to 8 carbon atoms, optionally with at least one diene monomer. The preferred terpolymers include the combinations such as ethylene/butene-1/hexene-1, ethylene/propylene/butene-1, ethylene/propylene/hexene-1, ethylene/propylene/norbornadiene, ethylene/propylene/1,4-hexadiene and the like.

Typically, the gas composition also contains an amount of hydrogen to control the melt index of the polymer to be produced. In typical circumstances the gas also contains an amount of dew point increasing component with the balance of the gas composition made up of a non-condensable inerts, for example, nitrogen.

Depending on the second catalyst to be introduced into the reactor, the gas composition, such as the comonomer and hydrogen gas concentrations, can be increased or decreased. In the preferred embodiment the gas composition is decreased, particularly when a metallocene catalyst is utilized as the second catalyst in the process of the invention.

Typically, the reactant gas composition is diluted as above, for example, by either pressure purging or flow purging procedures well known in the art. During this step, as discussed above, impurities such as electron donors from the catalyst are also removed. Once the reactant concentrations are sufficiently diluted to accommodate the second catalyst and substantially all poisons are removed, the next step in the invention is to introduce the second catalyst.

It is most preferred when transitioning to a metallocene catalyst that no scavenging component, for example any of the organometallic compounds described above, be introduced into the reactor, especially just prior to the introduction of the metallocene catalyst.

In a preferred embodiment, the fluidized bed is maintained in a fluidized condition during the process of this invention.

Once the bed is fluidized and the new gas composition is introduced into the reactor, the second catalyst is introduced into the reactor under reactive conditions.

EXAMPLES

The properties of the polymers of the following examples were determined by the following test methods:

Melt Index: ASTM D-1238- Condition E
Density: ASTM D-1505
Bulk Density: The resin is poured via a ⅞" (2.22 cm) diameter funnel into a fixed volume cylinder of 400 cc. The bulk density is measured as the weight of resin divided by 400 cc to give a value in g/cc.
Particle Size: The particle size is measured by determining the weight of material collected on a series of U.S. Standard sieves and determining the weight average particle size based on the sieve series used.

The fines are defined as the percentage of the total distribution passing through a 120 mesh standard sieve. This has a particle size equivalent of 120 microns. Fines are important since high levels can lead to sheeting and fouling of the reaction cycle gas system. This results in heat exchanger distributor plate fouling requiring a reactor shut down to clean out.

Experimental indicators of operability problems utilize the measurement of temperatures which exist at the wall of the reactor. The temperature can be measured using any appropriate device but in general thermocouple devices are the most common. Since the temperature being measured is close to the reactor wall or "skin" they are referred to as skin thermocouples. Typically, the skin thermocouples are 5°–10° F. (1°–4° C.) below the internal bed temperature. Deviations from the baseline are indicative of reactor operability problems. These deviations can be either positive or negative.

Positive skin thermocouple deviations are the result of reactor sheeting due to a run away reaction at the wall of the reactor. As the temperature continues to increase, it reaches the melting point of the polymer at which point a solid strip of polymer is formed and dislodged to the main body of the reactor resulting in severe operability problems. In many cases; several hours to days of a reactor shut down are required to remove the sheets before restarting the polymerization process.

Negative skin thermocouple deviations are less serious since this is representative of "cold" polymer being situated at the wall of the reactor. However, this can present a problem if it persists since a solid insulating layer is formed at the walls of the reactor. If this layer continues to grow, it can quickly transform into a reactor sheet. This phenomenon is referred to as "cold bands". It has been found that the cold bands are often associated with the adherence of small polymer particles or "fines" to the wall of the reactor.

EXAMPLE 1

Transition from a Ziegler-Natta to a metallocene catalyst based on bis (n-butyl-cyclopentadienyl)zirconium dichloride is described in this example. It uses a deactivating agent which reacts with both the aluminum alkyl and Ziegler-Natta catalyst. The process did not result in fines adhering to the reactor walls as measured by "cold bands" or reactor sheeting. Also, the products produced did not result in the formation of gels in the film products. Finally, the transition time between catalysts was relatively fast.

Catalyst Preparations

The metallocene catalyst was prepared from 600° C. silica having a water content of 1.3 weight percent (Davison 948 silica, available from W. R. Grace, Davison Chemical Division, Baltimore, Md.). This catalyst was prepared by mixing 850 pounds (386 kg) of silica with 340 pounds (154 kg) of a catalyst precursor. The catalyst precursor was separately prepared by mixing together 82 pounds (37 kg) of a 28 weight percent solution of bis(1-methyl-3-n-butylcyclopentadienyl)zirconium dichloride in toluene with 1060 pounds (481 kg) of a 30 percent by weight solution of methylalumoxane available from Albemarle Corporation, Baton Rouge, La.). An additional 1300 pounds (590 kg) of toluene were added and the mixture held at 80° F. (27° C.) for 1 hour after which 6 pounds (3 kg) of a surface modifier (Kernamine AS-990 available from Witco Chemical Corporation, Houston, Tex.) was added and allowed to mix for one hour. Vacuum was applied and the catalyst was allowed to dry for fifteen hours. It was then dried at 175° F. (79° C.) to a free flowing powder. The final catalyst weight was 1216 pounds (552 kg). The final catalyst had a zirconium loading of 0.40% and aluminum loading of 12.5%.

The Ziegler-Natta catalyst was prepared by impregnating a titanium chloride, magnesium chloride, and tetrahydrofuran (THF) complex into silica support from a solution of THF. The silica is first dehydrated at 600° C. to remove water and chemically treated with tri-ethyl aluminum to further remove the remaining water. The catalyst was treated by adding tri-n-hexylaluminum (TNHAL) and diethylaluminum chloride (DEAC) in isopentane solution and dried to become the final Z-N catalyst. The final catalyst had a titanium content of 1% and DEAC/THF mole ratio of 0.26 and TNHAL/THF ratio of 0.29. Preparation of this catalyst is similar to that described in EP-A-0 369436.

Fluid-Bed Polymerization

The polymerization was conducted in a continuous gas phase fluidized bed reactor. The fluidized bed is made up of polymer granules. The gaseous feed streams of ethylene and hydrogen together with liquid comonomer were mixed together in a mixing tee arrangement and introduced below the reactor bed into the recycle gas line. Both butene and hexene were used as comonomers. Triethylaluminum (TEAL) was mixed with this stream as a 2 percent by weight solution in isopentane carrier solvent when used. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentration of all the gases were measured by an on-line gas chromatograph to ensure relatively constant composition in the recycle gas stream.

The solid Ziegler-Natta catalyst was injected directly into the fluidized bed using purified nitrogen as a carrier. Its rate was adjusted to maintain a constant production rate. The reacting bed of growing polymer particles is maintained in a fluidized state by the continuous flow of the make up feed and recycle gas through the reaction zone. A superficial gas velocity of 1–3 ft/sec (30 cm/sec—91 cm/sec) was used to achieve this. The reactor was operated at a total pressure of 300 psig (2069 kPa). To maintain a constant reactor temperature, the temperature of the recycle gas is continuously adjusted up or down to accommodate any changes in the rate of heat generation due to the polymerization.

The fluidized bed was maintained at a constant height by withdrawing a portion of the bed at a rate equal to the rate of formation of particulate product. The product was removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small steam of humidified nitrogen to deactivate any trace quantities of residual catalyst.

The reactor was equipped with twenty-six thermocouples mounted on the external surface of the reactor and expanded section. These were monitored continuously using a Honeywell TDC 3000 process computer. These thermocouples are referred to as "skin thermocouples".

Experimental Results

The reactor was at steady state using the conventional Zigler-Natta catalyst producing a 23 melt index and 0.923 density ethylene/butene copolymer. Run conditions are given in Table 1:

TABLE 1

| Run Conditions | |
|---|---|
| Catalyst | Titanium Ziegler-Natta |
| Ti (wt %) | 1 |
| Temperature (°C.) | 85 |
| Pressure (bar) | 21.7 |
| Ethylene (mole %) | 34.8 |
| Hydrogen (mole %) | 22.4 |
| Butene | 13.5 |
| TEAL Concentration (ppm) | 250 |
| Bed Weight (Kg) | 217 |
| Catalyst Productivity (Kg/Kg) | 4250 |
| Bulk Density (g/cc) | 0.38 |
| Average Particle Size (microns) | 605 |
| Fines (% less then 120 microns) | 0.16 |

The transition was started by reducing the TEAL concentration to 150 ppm. After four hours, the catalyst and TEAL feed were stopped. The reaction was allowed to continue for eight hours. After the eight hour hold period carbon dioxide was injected and allowed to circulate for four hours. The targeted quantity of carbon dioxide was about 17000 ppm. Gas analysis of the reactor contents resulted in a carbon dioxide level of 12500 ppm. The reactor was then depressurized to remove the high concentration of carbon dioxide and other impurities and by-products by multiple pressure purges with nitrogen from 10.7 to 5.2 bar (10.6 atm to 5.1 atm). The reactor composition was then adjusted by bringing in fresh gas components to the following levels:

| Ethylene (mole %) | 50 |
|---|---|
| Hydrogen (mole %) | 0.0185 (185 ppm) |
| Hexene (mole %) | 1.2 |

No increase in reactor temperature was noted as the concentrations were being established indicating the absence of any reaction by the Ziegler-Natta catalyst. The metallocene catalyst was then started at 9 g/hr. The catalyst feed was increased in 1 g/hr increments to increase the reaction rate. The reaction immediately commenced upon addition of the metallocene catalyst.

After twelve hours the reaction rate achieved steady state conditions. The ethylene/hexene copolymer product conditions at steady state were 3.0 dg/min melt index and 0.9153 g/cc density. The corresponding run conditions are shown in Table 2:

TABLE 2

| Run Conditions | |
|---|---|
| Catalyst | Metallocene |
| Zr (wt %) | 0.40 |
| Temperature (°C.) | 85 |
| Pressure (bar) | 21.7 |
| Ethylene (mole %) | 49.7 |
| Hydrogen (mole %) | 0.0189 (189 ppm) |
| Hexene | 1.36 |
| Bed Weight (Kg) | 500 |
| Catalyst Productivity (Kg/Kg) | 5500 |
| Bulk Density (g/cc) | 0.43 |
| Average Particle Size (microns) | 804 |
| Fines (% less than 120 microns) | 0.08 |

Polymer samples were collected at 1, 2, 3, 4, and 5 bed turnovers (Bed Turnover=Bed Weight/Total Production). These samples were then analyzed for gels using a tape extruder manufactured by Haake. There was no evidence of gels. The melt index during the transition was measured and there was no evidence of abnormally low melt index production.

Skin thermocouples were carefully monitored throughout the run and no significant deviation from the reactor temperature was observed. This indicates the absence of fines adhering to the wall of the reactor as measured by "cold bands", and the absence of sheeting as measured by positive excursions of the skin thermocouples. These results were verified by the total absence of sheets or chips in the polymer product.

These results show that the use of carbon dioxide results in the successful transition from a Ziegler-Natta catalyst to a metallocene catalyst free from reactor fouling or sheeting without the formation of high molecular weight gels in the resulting polymer product. Time of transition was relatively short requiring less than twenty-two hours.

EXAMPLE 2

Transition from a Ziegler-Natta to a metallocene catalyst based on bis (1, methyl-3-n-butylcyclopentadienyl) zirconium dichloride is described in this example. It utilizes an absorbent which could be any porous material such as inorganic oxides, inorganic chlorides and the like. In this example silica containing water was used to deactivate the Ziegler-Natta catalyst. The transition process of this example did not result in the formation of gels in the resulting film product. However, the reaction products formed resulted in fines adhering to the reactor walls as measured by "cold bands", and the transition time was relatively fast.

Catalyst Preparation

The metallocene and Ziegler-Natta catalysts used in this example were identical to that of Example 1.

Fluid-Bed Polymerization

The polymerization was conducted in the continuous reactor as described in Example 1.

Experimental Results

The reactor Was operating at a steady state using the conventional Ziegler-Natta catalyst producing a 24 (dg/min)

melt index and 0.924 (g/cc) density ethylene/butene copolymer. Run conditions were as shown in Table 3 below:

TABLE 3

| Run Conditions | |
| --- | --- |
| Catalyst | Titanium Ziegler-Natta |
| Ti (wt %) | 1.0 |
| Temperature (°C.) | 85 |
| Pressure (bar) | 21.7 |
| Ethylene (mole %) | 34.6 |
| Hydrogen (mole %) | 25.8 |
| Butene | 14.6 |
| TEAL Concentration (ppm) | 264 |
| Bed Weight (Kg) | 113 |
| Catalyst Productivity (Kg/Kg) | 3750 |
| Bulk Density (g/cc) | 0.39 |
| Average Particle Size (microns) | 792 |
| Fines (% less then 120 microns) | 0.178 |

The transition was started by reducing the TEAL concentration to 150 ppm. After four hours, the catalyst and TEAL feed were stopped. The reaction was allowed to continue for twelve hours. After the twelve hour hold period the reactor was depressurized by multiple pressure purges with nitrogen from 10.7 to 5.2 bar (10.6 atm to 5.1 atm). The reactor was repressurized to 21.7 bar (21.4 atm) with nitrogen. Wet silica (Davison 948) with a moisture content of 9.95 percent as determined by loss-on-ignition (LOI) was added to the reactor over a seven hour time period. (LOI can be measured by determining the weight loss of the absorbent, silica, which was held at a temperature of about 1000° C. for 16 hours). Silica was added based on a 1750 ppm by weight target to the reactor bed. The reactor contents were circulated with the silica for an additional four hours. The reaction by-products were then removed by pressure purging the reactor as described above. The reactor composition was then adjusted by bringing in fresh gas composition to the following levels:

| | |
| --- | --- |
| Ethylene (mole %) | 50 |
| Hydrogen (mole %) | 0.0185 (185 ppm) |
| Hexene (mole %) | 1.2 |

No increase in reactor temperature was noted as the concentrations were being established indicating the total absence of any reaction by the Ziegler-Natta catalyst. The metallocene catalyst was then started at 5 g/hr. The catalyst feed was increased in 0.5 g/hr increments to increase the reaction rate. The reaction was slow to initiate requiting approximately four hours from the time of catalyst injection.

After eighteen hours the reaction rate achieved steady state conditions. The ethylene/hexene copolymer product conditions at steady state were 3.5 dg/min melt index and 0.919 g/cc density. The corresponding run conditions are shown in Table 4:

TABLE 4

| Run Conditions | |
| --- | --- |
| Catalyst | Metallocene |
| Zr (wt %) | 0.40 |
| Temperature (°C.) | 85 |
| Pressure (bar) | 21.7 |
| Ethylene (mole %) | 50.1 |
| Hydrogen (mole %) | 0.0195 (195 ppm) |
| Hexene | 1.09 |

TABLE 4-continued

| Run Conditions | |
| --- | --- |
| Bed Weight (Kg) | 113 |
| Catalyst Productivity (Kg/Kg) | 4640 |
| Bulk Density (g/cc) | 0.43 |
| Average Particle Size (microns) | 904 |
| Fines (% less than 120 microns) | 0.02 |

Polymer samples were collected at 1, 2, 3, 4, and 5 bed turnovers. These samples were then analyzed for gels using the Haake extruder. No gels were formed. The melt index during the transition Was measured and low melt index production was indicated.

Skin thermocouples were monitored throughout the transition. No significant deviation from the reactor temperature was observed until the silica feed was initiated. At this point, the skin thermocouples decreased significantly resulting in the formation of "cold bands" indicating fines adhering to the walls of the reactor. Skin temperature readings decreased by as much as 15° C. Once the silica feed was stopped, the skin thermocouples began to recover back to their base line. However, they did not fully recover until well after the catalyst feed was started. No positive deviations of the skin thermocouples occurred.

These results show that the use of wet silica results in the successful transition from a Ziegler-Natta catalyst to a metallocene catalyst free from reactor fouling or sheeting without the formation of high molecular weight gels. The "cold band" formation is believed to be due to adherence of silica to the walls of the reactor. While un. desirable, it did not have a detrimental effect on reactor performance. Time of transition was longer than that of Example 1 requiring more than forty-eight hours.

COMPARATIVE EXAMPLE 1

Transition from a Ziegler-Natta to a metallocene catalyst based on bis (1-methyl-3-n-butylcyclopentadienyl) zirconium dichloride is described in this example. It does not use any deactivating agent to deactivate the Ziegler-Natta catalyst and shows the detrimental effect on product properties and reactor operability, Catalyst Preparation The metallocene and Ziegler-Natta catalysts used in this example were identical to that of Example 1.

Fluid-Bed Polymerization

The polymerization was conducted in the same continuous reactor as in Example 1.

Experimental Results

The reactor was at a steady state using the conventional Ziegler-Natta catalyst producing a 18 melt index and 0.925 density ethylene/butene copolymer. Run conditions are given in Table 5:

TABLE 5

| Run Conditions | |
| --- | --- |
| Catalyst | Titanium Ziegler-Natta |
| Ti (wt %) | 1.0 |
| Temperature (°C.) | 85 |
| Pressure (bar) | 21.7 |
| Ethylene (mole %) | 35.0 |
| Hydrogen (mole %) | 25.9 |

TABLE 5-continued

| Run Conditions | |
|---|---|
| Butene | 14.7 |
| TEAL Concentration (ppm) | 247 |
| Bed Weight (Kg) | 227 |
| Catalyst Productivity (Kg/Kg) | 3780 |
| Bulk Density (g/cc) | 0.40 |
| Average Particle Size (microns) | 722 |
| Fines (% less then 120 microns) | 0.198 |

The transition was started by stopping the catalyst and TEAL feed. The reaction was allowed to die for twenty four hours. The reactor was depressurized by multiple pressure purges with nitrogen from 10.7 to 5.2 bar (10.6 atm to 5.1 atm). The reactor composition was then adjusted by bringing in fresh gas composition to the following levels:

| Ethylene (mole %) | 50 |
|---|---|
| Hydrogen (mole %) | 0.0185 (185 ppm) |
| Hexene (mole %) | 1.2 |

As the ethylene was introduced a sudden increase in reactor temperature was noted. It rapidly increased from 85° C. to 91° C. after which it decreased back to 85° C. The metallocene catalyst was then started at 9 g/hr. The catalyst feed was increased in 1 g/hr increments to increase the reaction rate. The metallocene reaction began immediately and continued to progress to a steady state production rate over the next twelve hours.

The melt index dropped very rapidly during the initial period to a value as low as 0.48 dg/min. This was the result of re-initiation of the Ziegler-Natta catalyst. After twelve hours the reaction rate achieved steady state conditions. The ethylene/hexene product conditions at steady state were 3.1 dg/min melt index and 0.916 g/cc density. The corresponding run conditions are listed in Table 6 below:

TABLE 6

| Run Conditions | |
|---|---|
| Catalyst | Metallocene |
| Zr (wt %) | 0.40 |
| Temperature (°C.) | 85 |
| Pressure (bar) | 21.7 |
| Ethylene (mole %) | 49.7 |
| Hydrogen (mole %) | 0.0185 (185 ppm) |
| Hexene | 1.20 |
| Bed Weight (Kg) | 227 |
| Catalyst Productivity (Kg/Kg) | 5160 |
| Bulk Density (g/cc) | 0.46 |
| Average Particle Size (microns) | 918 |
| Fines (% less than 120 microns) | 0.030 |

Polymer samples were collected at 1, 2, 3, 4, and 5 bed turnovers. These samples were then analyzed for gels using the same tape extruder of Example 1. There was a massive quantity of gels in the product. These gels persisted for several bed turnovers, and resulted in unacceptable film quality.

Skin thermocouples were monitored. During the initial period of the transition significant positive deviation from the reactor temperature was observed for several of the skin thermocouples indicating the occurrence of reactor sheeting. This persisted for a period of four hours after which normal readings were obtained. No negative deviations of the skin thermocouples were observed indicating the absence of fines adhering to the wall of the reactor. Several small sheets and chips were observed in the product shortly after the skin thermocouple deviation.

These results show the detrimental effects without using a deactivating agent. Formation of low melt index polymer resulted in severe gel formation and unacceptable product quality. Reactor continuity was also disrupted as a result of reactor sheeting for a short time period. Transition time was quite long requiring a total time of thirty six hours.

COMPARATIVE EXAMPLE 2

Transition from a Ziegler-Natta to a metallocene catalyst based on his(1-methyl-3n-butylcyclopentadienyl) zirconium dichloride is described in this example. It utilizes methanol to deactivate the Ziegler-Natta catalyst and shows the detrimental effect on product properties and reactor operability.

Catalyst Preparation.

The metallocene and Ziegler-Natta catalysts used in this example were similar to that of Example 1.

Fluid-Bed Polymerization

The polymerization was conducted in a continuous reactor similar to that of Example 1.

Experimental Results

The reactor was at steady state using the conventional Ziegler-Natta catalyst producing a 1 dg/min melt index and 0.918 g/cc density ethylene/butene copolymer. Run conditions were as shown in Table 7:

TABLE 7

| Run Conditions | |
|---|---|
| Catalyst | Titanium Ziegler-Natta |
| Ti (wt %) | 1.0 |
| Temperature (°C.) | 85 |
| Pressure (bar) | 21.7 |
| Ethylene (mole %) | 40.1 |
| Hydrogen (mole %) | 8.65 |
| Butene | 13.8 |
| TEAL Concentration (ppm) | 248 |
| Bed Weight (Kg) | 113 |
| Catalyst Productivity (Kg/Kg) | 3100 |
| Bulk Density (g/cc) | 0.47 |
| Average Particle Size (microns) | 726 |
| Fines (% less then 120 microns) | 0.055 |

The transition was started by reducing the TEAL concentration to 150 ppm. After four hours, the catalyst and TEAL feed was stopped. Methanol was then injected into the reactor. Methanol was added at a 1.33:1 stoichiometric ratio of catalyst and activator. The reactor was allowed to circulate for four hours after which time it was depressurized by multiple pressure purges with nitrogen from 10.7 to 5.2 bar (10.6 atm to 5.1 atm). The reactor composition was then adjusted to the following fresh gas composition targets:

| Ethylene (mole %) | 55 |
|---|---|
| Hydrogen (mole %) | 0.0105 (105 ppm) |
| Hexene (mole %) | 1.2 |

Significant positive skin thermocouple deviations from the reactor temperature were observed after only one bed turnover at several points. Sheets began to appear in the product, and shortly thereafter a reactor shutdown was required due to pluggage of the reactor product discharge system.

The melt index dropped during the initial period to a value as low as 0.47 dg/min indicating the formation of high molecular weight polymer. A polymer samples was collected at I bed turnover. These samples were then analyzed for gels using the same tape extruder of Example 1. The film produced from the polymer in this example contained an excessive amount of gels. The presence of gels confirms the melt index drop.

These results show the detrimental effects of a deactivating agent which forms an alkoxide type reaction by-product. Reactor continuity was unacceptable due to reactor sheeting. Finally, formation of low melt index polymer resulted in severe gel formation and unacceptable product quality.

While the present invention has been described and illustrated by reference to particular embodiments, it Will be appreciated by those of ordinary skill in the art that the invention lends itself to variations not necessarily illustrated herein. For example, it is not beyond the scope of this invention to transition between one or more mixed catalysts to one or more incompatible mixed catalysts and vice-versa or between a Ziegler-Natta catalyst and a chromium catalyst. It is also contemplated by the invention that one or more reactors can be used, where the process of the invention takes place within a first reactor or within a second reactor or in an intermediate location before entering the first (when one reactor is being used) or the second reactor (when two or more reactors are being used in series or otherwise). For this reason, then, references should be made solely to the appended claims for purposes of determining the true scope of the present invention.

We claim:

1. A process for transitioning from a polymerization reaction catalyzed by a first catalyst to one catalyzed by a second catalyst wherein said first and second catalysts are incompatible, said process comprising the steps of:
   a) discontinuing the introduction of the first catalyst into a reactor, wherein the first catalyst comprises a traditional Ziegler-Natta catalyst;
   b) introducing into and dispersing throughout the reactor a deactivating agent in an amount greater than about 1 molar equivalent, based on the total gram atom metal of the first catalyst in the reactor;
   c) purging the reactor; and
   d) introducing the second catalyst into the reactor in the absence of any scavenger, wherein the second catalyst comprises a metallocene catalyst.

2. The process of claim 1 wherein the amount of deactivating agent is greater than about 2 molar equivalent based on the total gram atom metal of the first catalyst in the reactor.

3. The process of claim 1 wherein said polymerization reaction is a gas phase process.

4. The process of claim 3 wherein the scavenger is an organometallic compound represented by the formula Al $R_{(3-a)} X_a$ where R is branched or straight chain alkyl, cycloalkyl or a hydride radical having from 1 to 30 carbon atoms, x is a halogen and a is 0, 1 or 2.

5. The process of claim 1 wherein the process is continuous.

6. The process of claim 1 wherein the deactivating agent is carbon dioxide.

7. The process of claim 1 wherein the molar ratio of the deactivating agent to the total metal of the first catalyst and any activator and any scavenger in the reactor is in the range of from greater than 1 to about 1000.

8. A process for transitioning from a polymerization reaction catalyzed by at least one first catalyst to produce at least one first polymer to a polymerization reaction catalyzed by at least one second catalyst to produce at least one second polymer, said process comprising the steps of:
   a) discontinuing the introduction of the first catalyst into a reactor, wherein the first catalyst comprises a traditional Ziegler-Natta catalyst;
   b) introducing into and dispersing throughout the reactor a deactivating agent in an amount greater than 1 molar equivalent based on the total gram atom metal of the first catalyst in the reactor;
   c) purging the reactor; and
   d) introducing the second catalyst into the reactor in the absence of any scavenger, wherein the second catalyst comprises a metallocene catalyst;
   wherein the first catalyst in the presence of the second catalyst under the same reactive conditions reduces the activity of the second catalyst by greater than 50%.

9. The process of claim 8 wherein the first and second polymers have different densities and/or melt indices.

10. The process of claim 8 wherein the process further comprises:
    i) discontinuing the introduction of the second catalyst into the reactor;
    ii) introducing another deactivating agent; and
    iii) introducing at least one third catalyst or reintroducing the first catalyst into the reactor.

11. The process of claim 8 wherein the third catalyst is incompatible with the second catalyst.

12. The process of claim 8 wherein the first polymer has a molecular weight greater than the second polymer at equivalent reactor operating conditions.

13. The process of claim 8 wherein the polymerization reaction is a gas phase process.

14. A process for converting a continuous olefin polymerization reaction catalyzed by first catalyst that is a Ziegler-Natta catalyst comprising a transition metal halide and an organometallic compound of Groups 1, 2 or 3 to a continuous olefin polymerization reaction catalyzed by a second catalyst that is a metallocene catalyst comprising a metallocene component and an activator, said process for converting comprising the steps of
   a) discontinuing the introduction of the first catalyst into a reactor;
   b) introducing into and dispersing throughout the reactor a deactivating agent in an mount greater than about 1 molar equivalent based on the total gram atom metal of the first catalyst in the reactor;
   c) purging the reactor; and
   d) introducing the second catalyst into the reactor in the absence of any scavenger.

15. The process of claim 14 wherein the polymerization is conducted in a fluidized bed reactor.

16. The process of claim 15 wherein the first polymer has a molecular weight distribution greater than 3.5 and the second polymer has a molecular weight distribution less than 3.3.

17. The process of claim 16 wherein said deactivating agent is reactive towards the organometallic compound to form at least one compound having a carboxylic acid functionality.

18. The process of claim 17 wherein the deactivating agent is carbon dioxide.

19. The process of claim 18 wherein the molar ratio of the deactivating agent to the total metal of the Ziegler catalyst and the organometallic compound in the reactor is in the range of from greater than 1 to about 1000.

20. The process of claim 19 wherein the polymerization reaction is a gas phase process.

21. A process for transitioning from a polymerization reaction catalyzed by a first catalyst to one catalyzed by a second catalyst wherein said first and second catalysts are incompatible, said process comprising the steps of:

a) discontinuing the introduction of the first catalyst into a reactor, wherein the first catalyst comprises a traditional Ziegler-Natta catalyst;

b) rendering the first catalyst substantially incapable of polymerization with the introduction into the reactor of a deactivating agent in an amount sufficient to inactivate substantially all of said first catalyst;

c) purging the reactor; and d) introducing the second catalyst into the reactor in the absence of any scavenging material, wherein the second catalyst comprises a metallocene catalyst.

22. The process of claim 21 wherein the polymerization reaction is a gas phase process.

23. The process of claim 22 wherein the molar ratio of the deactivating agent to the total metal of the first catalyst and an activator and any scavenger in the reactor is in the range of from greater than 1 to about 1000.

24. The process of claim 23 wherein the scavenger is an organometallic compound represented by the formula Al $R_{(3-a)}X_a$ where R is branched or straight chain alkyl, cycloalkyl or a hydride radical having from 1 to 30 carbon atoms, x is a halogen and a is 0, 1 or 2.

25. The process of claim 1 wherein the first catalyst in the presence of the second catalyst, under the same reactive conditions, reduces the activity of the second catalyst by greater than 50%.

26. The process of claim 16 wherein the first catalyst in the presence of the second catalyst, under the same reactive conditions, reduces the activity of the second catalyst by greater than 50%.

27. The process of claim 21 wherein the first catalyst in the presence of the second catalyst, under the same reactive conditions, reduces the activity of the second catalyst by greater than 50%.

* * * * *